April 14, 1959 R. S. HAHN ET AL 2,881,568
GRINDING MACHINE

Filed March 24, 1955 11 Sheets-Sheet 1

INVENTORS
ROBERT S. HAHN
GLENN JOHNSON
BY
Dike, Thompson, Sanborn & Bronstein
ATTORNEYS April 14, 1959    R. S. HAHN ET AL    2,881,568
GRINDING MACHINE

Filed March 24, 1955    11 Sheets-Sheet 5

INVENTORS
ROBERT S. HAHN
GLENN JOHNSON
BY
Dike, Thompson, Sanborn & Bronstein

ATTORNEYS

April 14, 1959  R. S. HAHN ET AL  2,881,568
GRINDING MACHINE
Filed March 24, 1955   11 Sheets-Sheet 9

INVENTORS
ROBERT S. HAHN
GLENN JOHNSON
BY
Dike, Thompson, Sanborn & Bromsten
ATTORNEYS

FIG. 20

INVENTORS
ROBERT S. HAHN
GLENN JOHNSON
BY
Dike, Thompson, Sanborn & Bronstein
ATTORNEYS April 14, 1959 R. S. HAHN ET AL 2,881,568
GRINDING MACHINE
Filed March 24, 1955 11 Sheets-Sheet 11

INVENTORS
ROBERT S. HAHN
GLENN JOHNSON
BY
Dike, Thompson, Sanborn & Bronstein
ATTORNEYS United States Patent Office 2,881,568
Patented Apr. 14, 1959

2,881,568
GRINDING MACHINE

Robert S. Hahn, Northboro, and Glenn D. Johnson, Holden, Mass., assignors, by mesne assignments, to The Heald Machine Company, a corporation of Delaware Application March 24, 1955, Serial No. 496,504

17 Claims. (Cl. 51—50)

This invention relates to grinding machines, particularly those performing repetitive cycles and, in part, controlled by a work gage.

A difficulty with such machines has been the necessity for repeated adjustments to correct for thermal changes in the machine and for wear of the truing diamond.

The most serious effect of wear and thermal changes has been to alter from cycle to cycle the position of the cutting surface of the wheel at the beginning of the finishing operation, relative to the finished work surface. If, at the time the feed was reduced, the cutting surface of the wheel was too near the finished work surface, the desired finish and accuracy were not obtained. If the wheel surface was too far from the work, excessive time was required because the finish feed must be extremely slow. In many cases finish feed should include a spark-out period in which the wheel is fed by the spring of the machine and work, to permit the most accurate sizing of the work. That is, if the wheel reciprocates relatively to the work, it must make a whole number of passes to prevent taper, and the accuracy of sizing depends therefore upon the amount of metal removed in the last pass. It has been customary repeatedly to adjust the position of the truing diamond or of some related part of the machine, but even so it has been impractical to control the position of the cutting surface at the beginning of the finishing operation with sufficient accuracy to permit using a finish feed as slow as desirable.

The principal object of this invention is to provide a machine in which the effects of such changes and wear are reduced to such an extent that the machine, particularly if equipped for automatic loading, will produce accurate work efficiently for long periods of time without attention and will require a minimum of skill on the part of the attendant.

This result is accomplished partly by providing a simplified, smooth-acting mechanism to actuate the machine without use of hydraulic power and therefore with minimum thermal changes. A machine is provided which will readjust itself so that cumulative thermal and other changes affect mainly the length of fast feed or approach which occurs before the finishing operation, and thereby maintain the position of the cutting surface of the wheel at the beginning of the finishing operation practically constant from cycle to cycle, relative to the finished work surface. The length of fast feed or approach, in comparison with the length of slow finish feed, has little effect on the time of the cycle.

The automatic readjustment occurs at each grinding cycle if necessary and practically eliminates the most serious effect of thermal and other changes even in hydraulically actuated machines, since such changes are slow and cumulative, changes from cycle to cycle being usually negligible.

It is desirable to index a truing diamond by occasionally turning it to present a new sharp surface to the wheel, but in practice diamonds are not symmetrical and consequently the relation between the truing surface and the work is changed by indexing. The automatic adjustment of the length of finish feed is therefore especially valuable when the diamond is indexed. Indexing, however, affects one cycle of the machine before the automatic adjustment can be made. For this reason it is preferable not to index the diamond at each cycle, but means are provided to index it automatically whenever a number of truing operations have been performed.

Another object is to maintain constant the period of reduced feed for the finishing operation so as to provide a spindle deflection at the time each workpiece is finished which is constant, and thus to control the taper of the work.

Another object is to provide novel means to relieve spindle spring prior to truing and before the wheel re-enters the work after truing.

Another object is to provide means to compensate for wheel wear and truing which has a precise rather than an incremental adjustment.

The accomplishment of these and other objects will be apparent from the following description of a preferred embodiment and modifications thereof together with the illustrative drawings in which.

Figure 1:
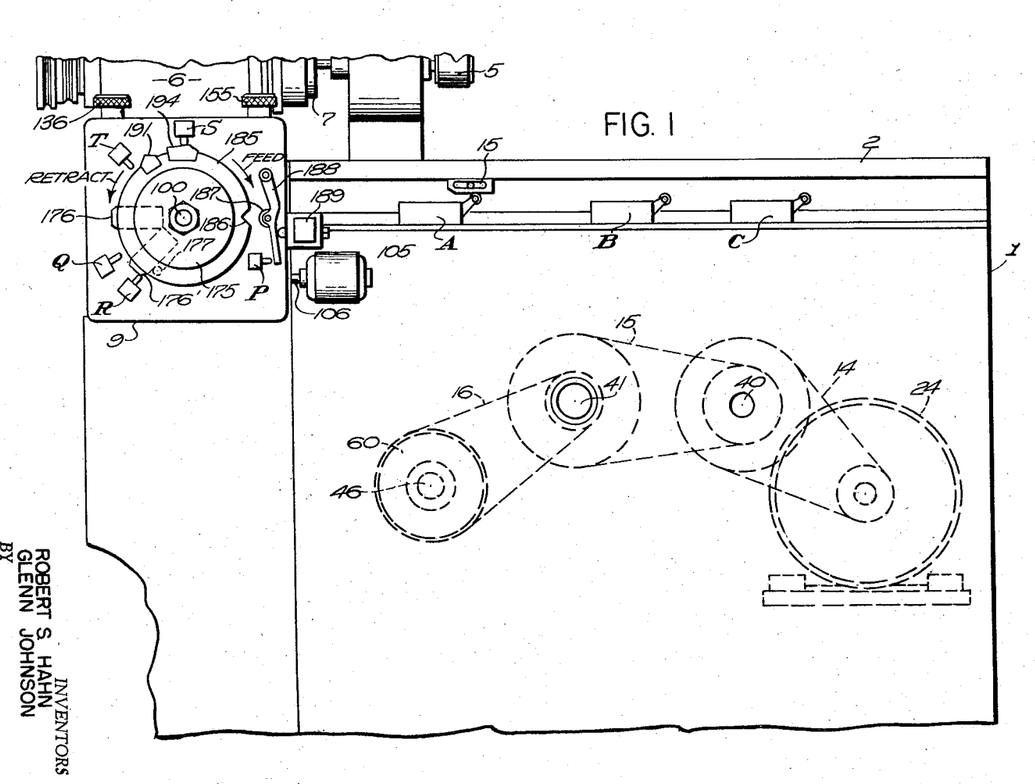
Fig. 1 is a front elevation of a preferred embodiment of the machine with some of the parts removed.
Figure 2:
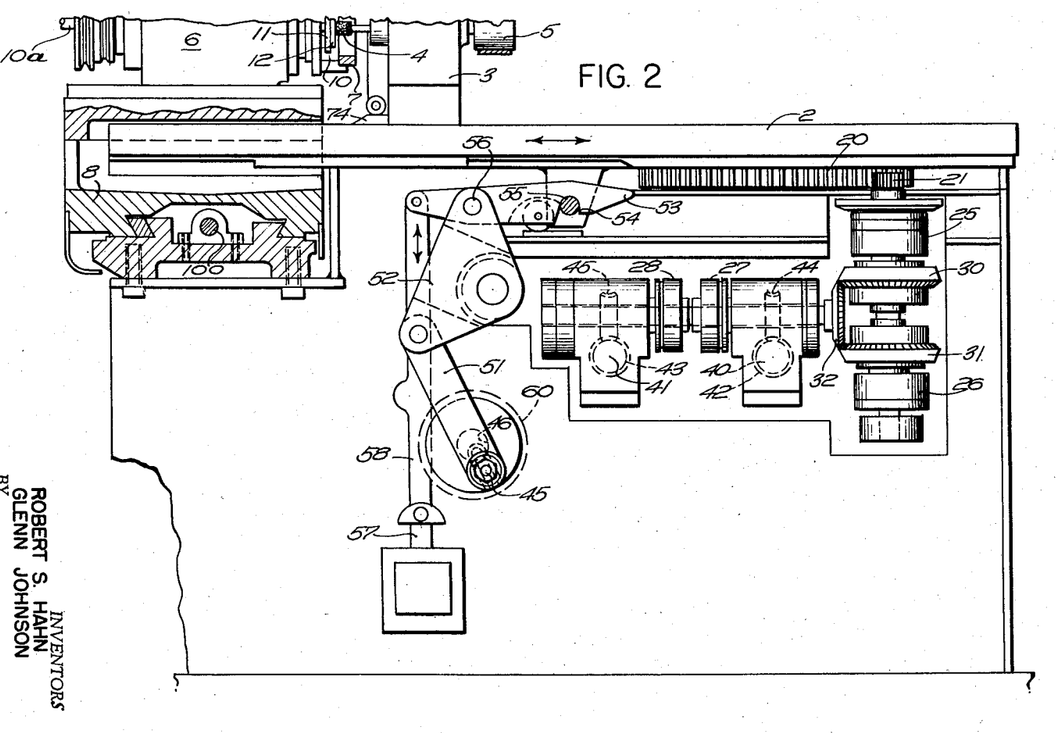
Fig. 2 is a front elevation of the machine of Fig. 1 in which some of the parts have been added and others removed.

In the drawings, referring to Figs. 1 and 2, a base 1 slidably supports a table 2 upon which is mounted a wheel head or support 3 carrying an internal grinding wheel 4 driven by conventional power means, which may include a belt 5.

Work head or support 6, including conventional means to support and rotate a workpiece 7, is mounted on a slide 8 so that the workpiece 7 may be fed against the wheel 4 by a feed screw 100 and feed mechanism contained in a feed box indicated at 9, and details of which are to be described in connection with Figs. 9 and 13–16. Thus the wheel 4 may be inserted inside the workpiece 7 and also reciprocated across the face of the work during grinding by movement of the table 2, and the wheel 4 may be fed relatively into the work 7 by movement of the work head 6 on the slide 8 actuated and controlled by the feed mechanism 9.

A gage 10 carried on an axially slidable shaft 10a in the work head has a large element 11 which enters the work to stop the feed and retract the wheel 4 when finished size is reached, and a smaller element 12 which is adapted to enter the work before finished size is reached, to control a truing operation as will be described.

It will be understood that either the work support 6 or the wheel support 3 may be mounted on the slide 8 so that one is movable relative to the other.

Table traverse and reciprocating mechanism

In the first embodiment and referring to Figs. 1, 2, 5, 6, 8 and 10, the table 2 is moved by a rack 20 and pinion 21 driven by a motor 24 and controlled by four electrically engaged clutches, respectively a table-in clutch 25, a table-out clutch 26, a rapid-traverse clutch 27 and a slow-traverse clutch 28. When the table-in and rapid-traverse clutches 25 and 27 are engaged, the table 2 moves in rapidly from right to left toward the work. As the rapid-traverse clutch 27 is disengaged, the slow-traverse clutch 28 is engaged and the table traverse rate is slowed. When the table-in clutch 25 is disengaged and the table-out clutch is engaged, table traverse is to the right at a rapid or slow rate depending upon whether the rapid-traverse or slow-traverse clutches 27 or 28 are engaged. The table-in and table-out clutches 25 and 26 are driven in reverse directions by the bevel gears 30 and 31 from a driving pinion gear 32, as seen in Fig. 2. A rapidly turning shaft 40 and a slower turning shaft 41, as seen in Figs. 1, 2, 6 and 10, are driven from the motor 24 by the sprocket and chain mechanisms 14 and 15, seen in Figs. 1, 5 and 10, to turn the clutches 27 and 28 through worms 42, 43 and worm gears 44, 45 at their respective rapid and slow rates. Thus, by means to be described, various combinations of the clutches 25, 26, 27 and 28 may be engaged to traverse the table 2 in or out and at a rapid or slow rate.

Figure 8:
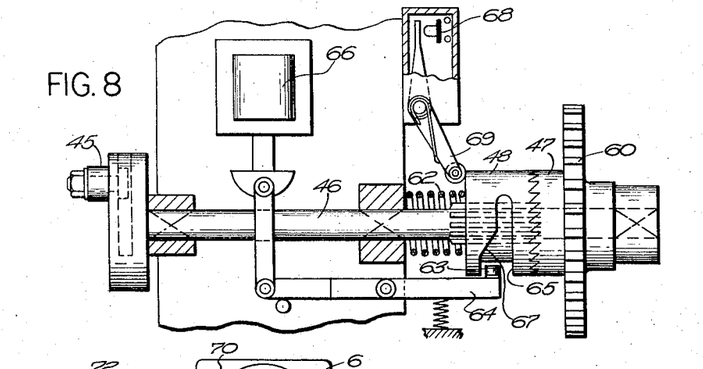
Fig. 8 is an elevation taken from the right-hand end of the machine, of parts including the table-reciprocating clutch and crank mechanism.

Referring to Figs. 2 and 8, additional means are provided once the wheel has been moved into the work to reciprocate it rapidly back and forth across the face of the work during grinding, comprising a crank 45 on a drive shaft 46 driven, as seen in Figs. 1 and 8, through a chain 16, a sprocket 60 and a clutch 47, a connecting rod 51, a rock arm 52 and a latch 53 having a notch 54 engageable with a pin 55 connected to the table 2. The latch 53 falls of its own weight about a pivot 56 to engage the latch 53 to the table to reciprocate it back and forth when the wheel 4 hase been moved into the work, and after all the table-moving clutches 25–28 have been disengaged and it is raised to disconnect it from the table by means of a solenoid 57 and connecting link 58.

The crank 45 is normally maintained by the clutch 47 on dead center position, as seen in Fig. 2, so as to facilitate engagement of the latch 53 and table while both are in a known position, and to help overcome the inertia of the table after engagement. The clutch 47 has an element 48 keyed to and slidable axially on a splined section 49 of the shaft 46 and which is engaged by a spring 62 to connect the crank 45 to the sprocket 60. The clutch 47 is engaged when a pin 63 on a rock arm 64 is withdrawn downwardly from a slot 65 in the element 48 by a solenoid 66 connected to the rock arm 64. When the solenoid 66 is de-energized, the pin 63 is raised by the weight of the solenoid plunger into the slot 65, engaging a cam portion 67 of the slot, withdrawing the clutch element 48 to the left to disengage the sprocket 60 from the crank 45 and preventing the crank from moving beyond dead center. A switch 68 is closed by a rock arm 69 when the clutch 47 is disengaged, and opened by engagement of the clutch 47 for a purpose to be described.

Modification of the traverse mechanism

Figure 3:
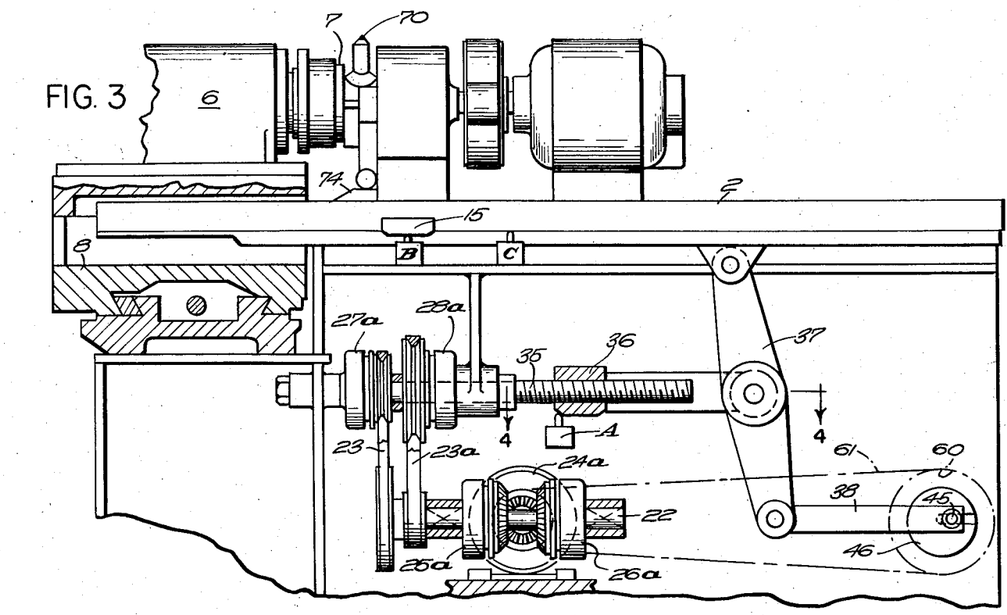
Fig. 3 is a front elevation of a modified form of the machine.
Figure 4:
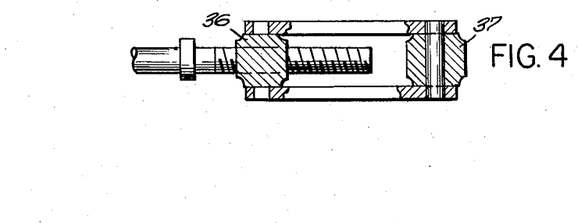
Fig. 4 is a top plan of some of the parts along the line 4—4 of Fig. 3.
Figure 5:
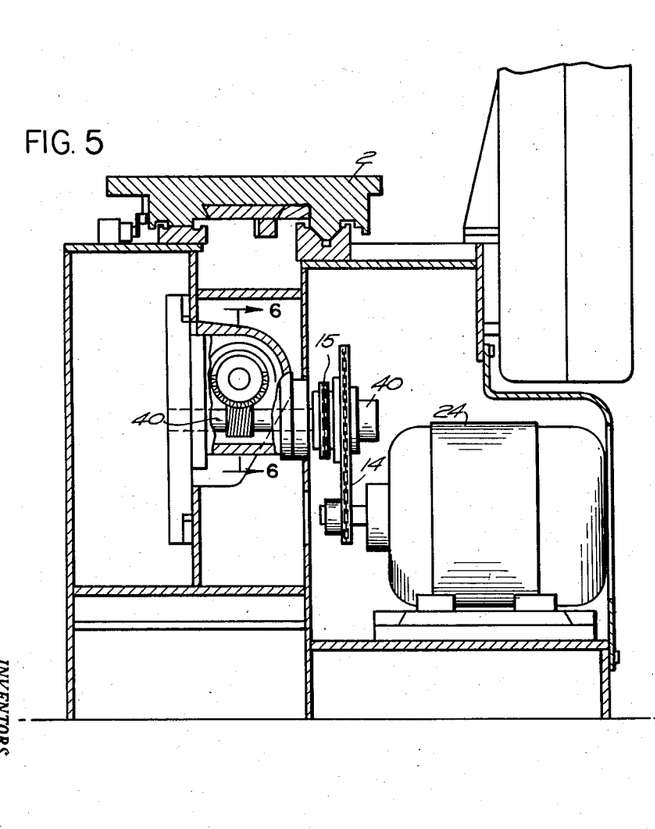
Fig. 5 is an end elevation partly in section taken from the right-hand end of the machine as shown in Figs. 1 and 2.
Figure 6:
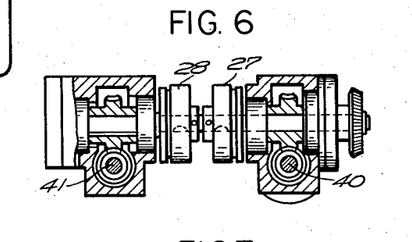
Fig. 6 is an elevation partly in section of some of the parts taken along the plane 6—6 of Fig. 5.

A modified form of the traverse mechanism shown in Figs. 3 and 4 omits the latching mechanism for reciprocating the table during grinding. As seen in Fig. 3, a drive motor 24a is arranged to turn a shaft 22 in one direction through an electric table-in clutch 25a and in the opposite direction through a table-out clutch 26a. The shaft 22 is engaged through a belt 23 and a rapid-traverse clutch 27a to a traverse screw 35 to turn it rapidly and through a belt 23a and a slow-traverse clutch 28a to turn it slowly. The rotation of the screw 35 moves a nut 36 attached to the table 2 through a rocking lever 37, the latter being held fast at its bottom and during traverse by a link or connecting rod 38 connected at its other end to the crank 45 of a crank shaft 46, and a clutch 47 previously described, and as seen in Fig. 8.

Thus the table 2 is traversed by the screw 35 with the crank 45 on dead center to move the wheel in and out of the work and is reciprocated by the crank 45 with the traverse screw 35 immobile to rock the lever 37 about its center connection to the nut 36 while the wheel is grinding.

Second modification of the traverse mechanism

Figure 20:
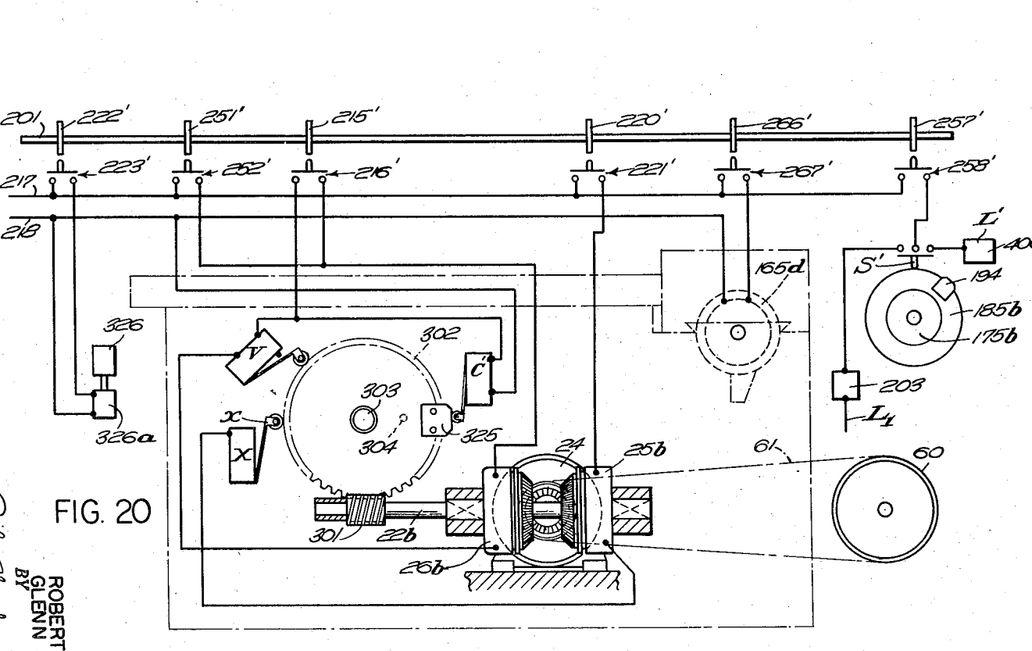
Fig. 20 is a layout showing control mechanism and associated parts for the mechanism of Figs. 18, 21 and 22.

A second modified form of the traverse mechanism is shown in Figs. 18–22 and includes a dashpot 300 to control the speed of the table for truing and to hold the center of a lever 37b stationary while the table is reciprocated by a crank 45b. As seen in Fig. 20 the drive motor 24 is arranged to turn a shaft 22b in one direction through an electromagnetic "table-in" clutch 25b and in the opposite direction through a similar "table-out" clutch 26b. Rotation of the shaft 22b turns a worm 301 meshing with a gear 302 on a crankshaft 303 which turns a crank 304 moving a link 305 and a lever 306 which is fulcrumed at its lower end 307. The upper end of the lever 306 is forked to straddle a spring cage 308 and slotted to engage trunnions 309 on each side of the cage 308. When the "table-in" clutch 25b is engaged, the rocking of the lever 306 moves the cage 308 to the left from the position shown, which is the loading position, force being transmitted through a washer 320, a compressed spring 321, a washer 322 and a piston rod 323 to move a piston 324 until it is stopped by the left end of the dashpot cylinder 300. The dashpot does not restrict this motion because a bypass valve 326 operated by a solenoid 326a is open. The crank 304 continues to turn to position x, where it is stopped by a limit switch X operated by a cam 325 on the gear 302, further compressing the spring 321 against the washer 322 which is stopped by a shoulder on the rod 323. Threaded on the rod 323 is a clevis 323' pinned to the lever 37b.

Thus the table 2 is traversed to move the wheel into the work. The table may be stopped with the wheel in central position relative to the work, as shown at 4', for plunge grinding during the roughing operation. Plunge grinding increases the rate of metal removal, since the wheel remains in contact with the full length of the work. For this purpose the crank 45b is shown in its downward position when stopped, that is, the crank, relative to the clutch 47 which drives it, is 90° from the position of the crank 45 in Fig. 8, while the crank 304 is at position x.

For truing, the clutch 26b is engaged, turning the gear 302 and the crank 304 to position y, thus moving cage 308 toward the right. The solenoid-operated bypass valve 326 is closed at this time and when the piston 324 moves to the right it forces oil to a reservoir 327 through a throttle 328 which governs the truing speed. Oil is drawn from the reservoir through a check valve 329. Because the piston 324 and piston rod 323 move more slowly than the cage 308 and washer 322, the spring 321 is further compressed by relative movement of the cage and piston 323, the cage this time compressing the spring 321 against the washer 320.

The table 2 is thus moved to the right until the cam 325 operates the switch Y, de-energizing the clutch 26b. At this point the switch B closes causing clutch 25b to be energized, turning the cam 325 on the gear 302 toward the switch X until this switch is operated. The crank 304 is thus moved back to position x, moving cage 308 to the left and urging piston 324 which forces oil through throttle 330 and draws oil through check valve 331.

When the wheel has thus been moved into the work the cam 15 operates switch A, causing the solenoid 66 to be energized and releasing the clutch 47 which turns the crank 45b and reciprocates the table and wheel through the link 386 and the lever 37b.

To aid in reversing the table at each end of its grinding stroke an arm 340 is oscillated by a link 341. The arm 340 is fulcrumed on a square section 342 in the center of a torsion bar spring 343 (Fig. 19) which has additional square sections 344 at each end fastened to the base 1b. Rocking of the arm 340 in either direction from the position shown twists the spring 343 which tends to return the lever 340 and the table 2 to a central position thus supplying at least part of the force required to reverse the table. A tension spring 343' (Fig. 18) may be used instead of or in addition to the torsion spring 343.

A weight 350 is provided at the upper end of the arm 340 and oscillates in a direction opposite to that of the table 2 providing a pulsating horizontal force opposite to the pulsating horizontal force produced by the table as it reciprocates at high speed, and providing a pulsating couple opposite that produced about the center of gravity of the base by the table 2. This weight and spring arrangement constitutes a linear and angular dynamic vibration absorber.

Figures 18, 19:
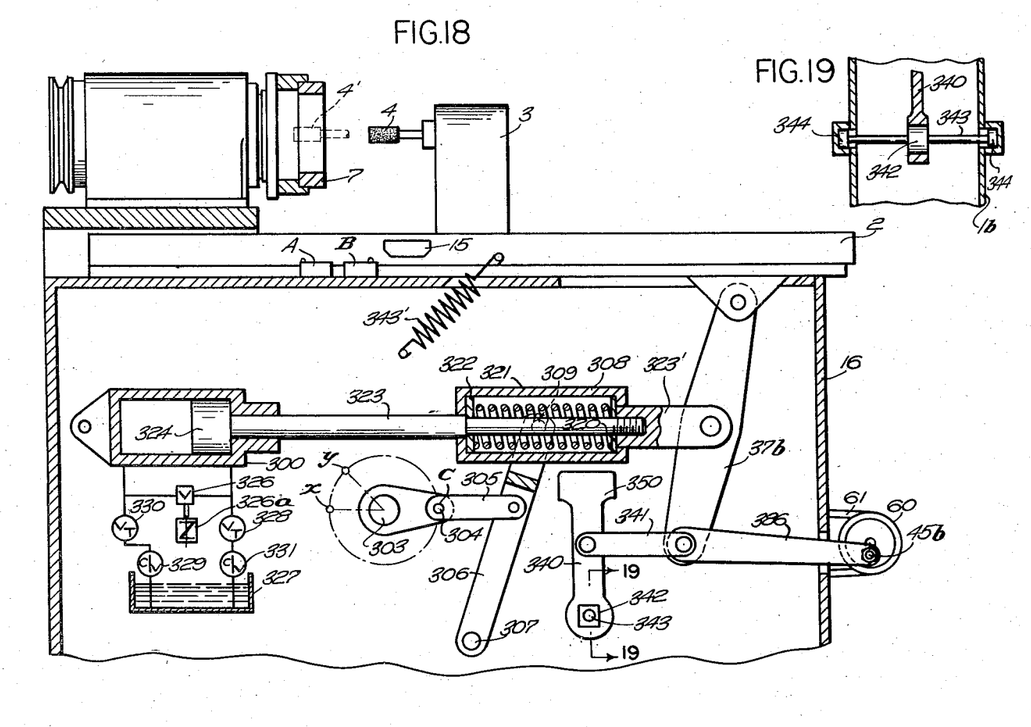
Fig. 18 is a front elevation partly in section of another modification of the machine.
Fig. 19 is a view taken along the line 19—19 of Fig. 18.

When the work has been ground to finish size the crank 45b is disengaged from the sprocket 60 as has been described, and the clutch 26b is engaged turning the crank 304 to its position shown in Fig. 18, running the table 2 to the right to its loading position.

It is seen that provision of the dashpot 300 provides both rapid and slow traverse speeds from a constant speed traverse drive and thus eliminates the rapid and slow speed traverse clutches 27 and 28. By the use of the dashpot control arrangement, the rate of the slow traverse is made adjustable to a precise degree. This arrangement also eliminates the latch 53 and associated operating mechanism including the solenoid 57 of Fig. 2.

*Truing mechanism*

Figure 9:
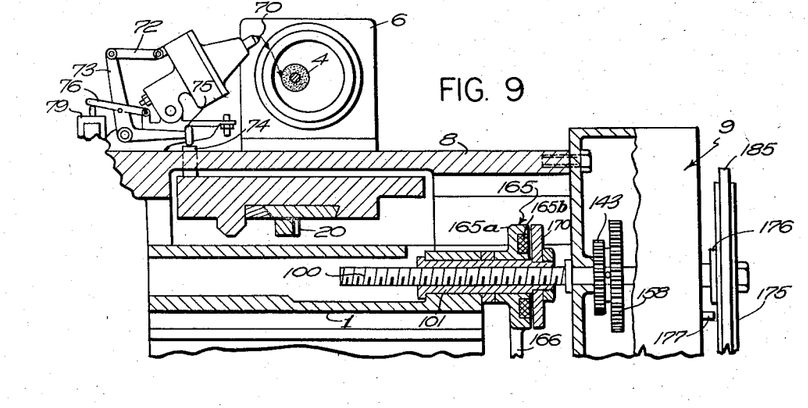
Fig. 9 is an elevation partly in section taken from the left end of either of the machines shown in Figs. 1 to 3, showing part of the feed mechanism.
Figures 10, 11, 12:
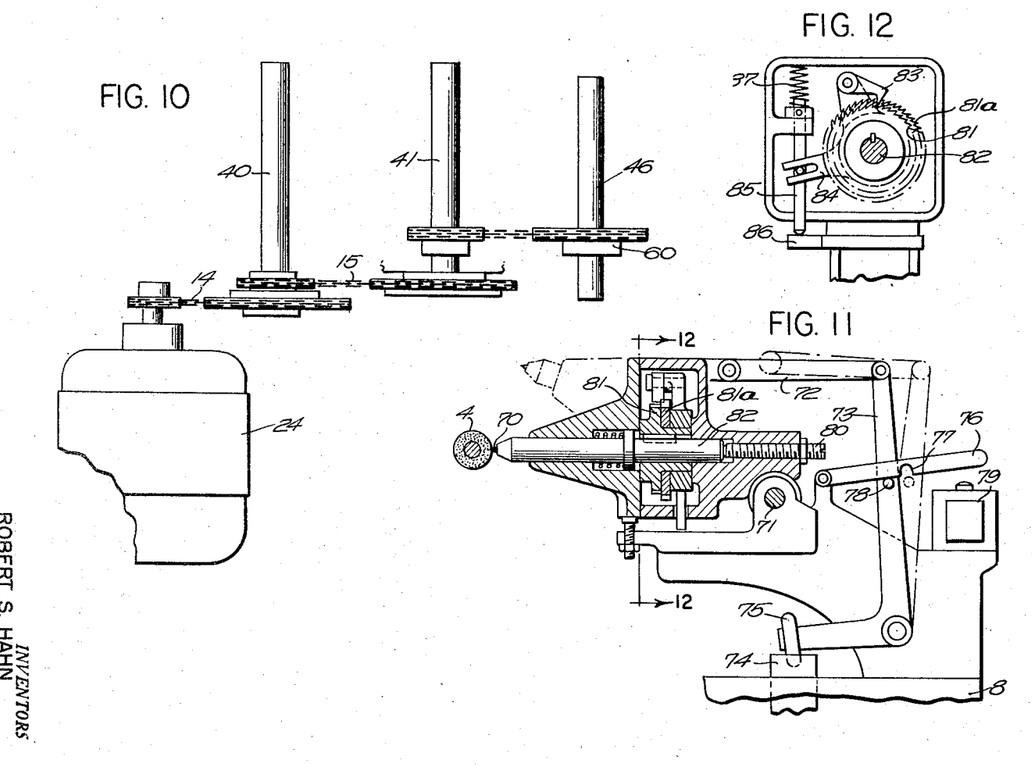
Fig. 10 is a top plan of some of the parts seen in Figs. 1 and 2 for reciprocating the table.
Fig. 11 is an end elevation partly in section showing the truing mechanism and tool and means to operate it.
Fig. 12 is a front elevation partly in section of some of the parts taken along the line 12—12 of Fig. 11.

A truing mechanism as seen in Figs. 9 and 11, and also in Fig. 3 where it is located on the modified machine in the same position as in the machine of Figs. 1 and 2, comprising a truing tool, which may be a diamond, is supported in a fixed position on the slide 8 and arranged when in operating position to true the wheel 4 while the wheel is traversed across it after the slide 8 is positioned in a predetermined relation to the wheel 4. In other words, the truing diamond in operating position is normally fixed with relation to the work although it will be understood that thermal and other changes as well as wear will slightly alter the effective position of the diamond.

The truing tool 70 is arranged to be lowered about a pivot 71 into operative position with respect to the wheel 4, as seen in Fig. 11, and to be raised into inoperative position out of the way of the wheel head, as shown in dotted line, by a link 72, a rock arm 73 and a cam 74 on the table 2. A cam follower 75 on the rock arm 73 rides down on the cam 74 and lowers the truing tool 70 to operative position when the wheel 4 is run out on the table 2 for truing. When the wheel 4 is run back into the work the cam 74 raises the rock arm 73 and the truing tool 70 into inoperative position where it is held by a pivotal latch 76 having a notch 77 engaging a pin 78 on the rock arm. A solenoid 79 is energized to raise the latch 76 and release the truing tool 70 at the proper time, by means to be described.

The truing tool 70 may be adjusted in its operating position with respect to the wheel by a set screw 80 and is arranged to be rotated or indexed, preferably after several grinding cycles, for the purpose of keeping the tool 70 sharp, by a ratchet 81, seen in Fig. 12, keyed to the shaft 82 supporting the truing tool, and a pawl 83. The pawl 83 rides on a larger ratchet 81a which is free to turn on the shaft 82 and has one or more teeth of extra depth which allow the pawl 83 to engage the ratchet 81. The pawl 83 moves the ratchet 81a each time the truing tool is lowered and raised to and from its operative position, and moves the ratchet 81 each time it falls into a deep tooth in the ratchet 81a. The pawl 83 is moved by a forked arm 84 engaging a slidable stud 85 which is raised by a boss 86 when the truing tool is lowered, and is lowered by a spring 87 when the truing tool is raised clear. Thus, although the truing tool 70 may be rotated while in a fixed position against the set screw 80 with respect to the work head 6, rotation brings a new surface of the truing tool 70 into engagement with the wheel 4 and so changes the position of the effective surface of the truing tool relative to the center of the work, the truing tool being unsymmetrical in practice.

*Feed mechanism*

Referring to Figs. 1, 9 and 13–15, inclusive, the feed mechanism 9 is attached to the slide 8 and includes the feed screw 100, which engages a nut 101 which though rotatable is fixed to the base 1 in a direction axially of the feed screw, i.e., from left to right as seen in Fig. 9. When the nut 101 is not turning, rotation of the feed screw feeds the slide 8 and the work support 6 relative to the wheel 4. When the feed screw 100 is not turning, rotation of the nut 101 also feeds the slide 8.

Figure 14:
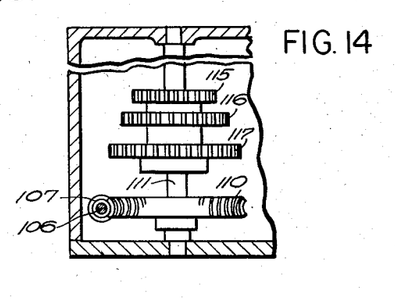
Fig. 14 is a top plan of some of the parts of the feed mechanism.
Figure 15:
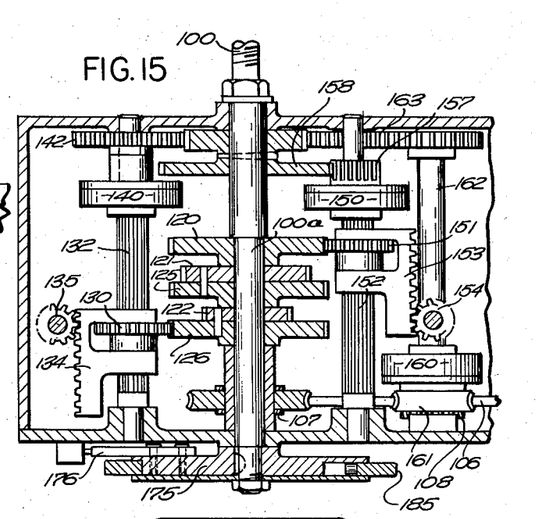
Fig. 15 is a top plan of part of the feed mechanism and its control mechanism.

The feed screw 100 is rotated by the mechanism shown in Figs. 14 and 15. An electric feed motor 105 turns a shaft 106 having a feed worm 107 and a retraction worm 108. The feed worm 107 drives a gear 110 on a drive shaft 111 to which is fast a small driving gear 115, a medium driving gear 116 and a large driving gear 117. The small driving gear 115 engages a large driven gear 120, the medium driving gear 116 engages a medium gear 121 and the large driving gear 117 engages a small driven gear 122. The medium driven gear 121 is fast to an adjacent driving gear 125 equal in size to the gear 120 and the small driven gear 122 is fast to an adjacent driving gear 126, also equal in size to the gears 120 and 125, but the driven gears 120, 121 and 122 rotate independently on a machined portion 100a of the feed screw since they are driven at varying speeds by the driving gears 115, 116 and 117. For rapid feed, a gear 130, keyed to a splined shaft 132 and slidable axially of the shaft, may be shifted to either one of the gears 120, 125 or 126 to produce a selection of fast feed rates. The gear 130 is shifted along the shaft 132 by a rack 134 and pinion 135 connected to a knurled knob 136, seen in Fig. 1, on the top of the feed box 9. An electrically engaged fast feed clutch 140 connects the splined shaft 132 to the feed screw 100 through gears 142 and 143.

Similarly, the feed screw 100 may be selectively connected to either one of the gears 120, 125 or 126 through slow speed gears 157 and 158, thus providing a selection of slow feed rates. A shiftable gear 151 keyed to and slidable axially on a splined shaft 152 may be shifted by a rack 153 and pinion 154 movable by a knurled knob 155 seen in Fig. 1. The gear 151 drives an electrically engaged slow feed clutch 150, the driven side of which is connected to the feed screw through the slow speed gears 157 and 158.

An electrically engaged retraction clutch 160 connects the motor shaft 106 to reverse the feed screw 100, through the retraction worm 108, a gear 161, a shaft 162 and the gears 163 and 143.

Thus, either one of the clutches 140, 150 or 160 may be selectively engaged, by means to be described, to provide either fast or slow infeed or retraction of wheel and work by rotation of the feed screw 100.

Figure 13:
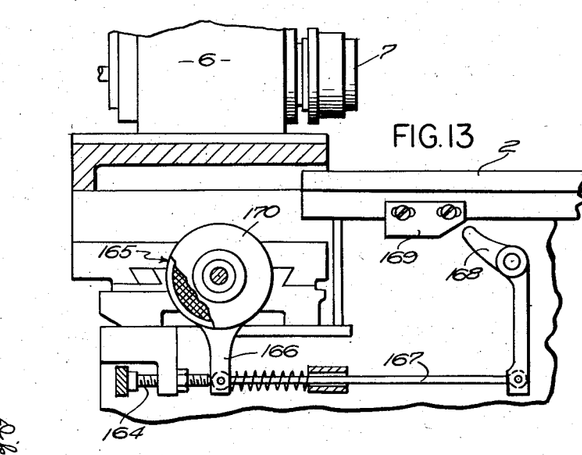
Fig. 13 is a partial front elevation showing the clutch mechanism for advancing the wheel relative to the work to compensate for truing.

Means independent of rotation of the feed screw 100 are also provided for advancing the work toward the wheel by a predetermined amount during each cycle to compensate for reduction of the wheel diameter caused by wheel wear and truing. As seen in Figs. 9 and 13, an adjustable one-way clutch 165, comprising a drive element 165a having a coil 165b, is actuated by movement of the table 2 and arranged when moved in one direction to rotate the nut 101, thereby to advance the feed screw 100 axially. The clutch element 165a is actuated by an arm 166, a link 167 and a rock arm 168, which in turn is engaged by a cam 169 under the table 2 to rotate a disk 170 and the nut 101 to which it is keyed, advancing the feed screw 100 axially when the table 2 moves out to the right at the end of each grinding cycle. The coil 165a is connected across the table-out clutch 26 and so is energized to engage when the arm 166 moves in one direction but not when the clutch arm 166 moves in the other direction. The amount of advance may be adjusted by a micrometer screw 164 which controls movement of the arm 166 to a precise degree. Thus, the advance to compensate for wear and truing remains constant from cycle to cycle.

*Feed control*

Referring to Figs. 1, 9 and 15, a feed dial or wheel 175, attached fast to the feed screw 100 and located conveniently outside of the feed box 9, has attached to it a cam 176 which abuts against a fixed stop pin 177 when the feed screw 100 is fully retracted, thus establishing a fixed retracted position. The cam 176 also closes a switch R when retracted against the stop pin 177, for a purpose to be described, and, when retracting after rough grinding for truing the wheel, the cam 176 closes a switch Q, establishing a truing position of the truing tool 70 relative to the wheel 4, as will be further described.

Still referring to Figs. 1, 9 and 15, mounted on the periphery of the feed dial 175 with a frictional sliding fit is a slip ring 185. The slip ring has a notch 186 engaged by a roll 187 on a slip ring indexing arm 188, which is moved to the left by a slip ring indexing solenoid 189 to index the slip ring 185 to a known position at the finish of the grinding cycle before the wheel has been retracted from the work, as will be described.

The slip ring 185 carries a cam 191 which operates a switch T during rough grinding infeed to cause the wheel to be retracted from the work for truing, as will be described. The slip ring 185 also carries a cam 194 for operating a switch S for reducing the feed for finishing the work after truing, as will be described.

It will be understood that additional means for changing feed rates may be added and that the feed rate may change during what we call "the finishing operation." That is, the finish or final feed may consist of more than one feed reduction and may include sparkout.

Figure 16:
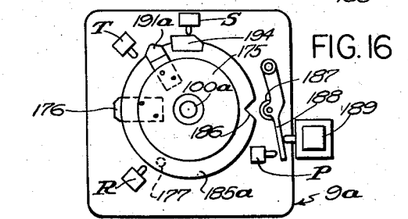
Fig. 16 is a front elevation of a modified form of the control mechanism for the feed mechanism.

In a modified form of the control for the feed mechanism shown in Fig. 16, the switch Q is omitted, and the cam 191a operating the switch T is fast to the feed dial 175 instead of to the slip ring 185, producing a modified cycle to be explained.

In the embodiment described, the truing tool and the workpiece are moved as a unit toward the wheel to feed the wheel into the work and also to position the wheel relative to the truing tool for truing. The principle would be the same if the workpiece and truing tool were fixed in spaced relation and the wheel fed toward them for grinding and truing. Under either condition, according to the principle of this invention, once the position of the truing tool point is preadjusted in a fixed relation with respect to the finished surface of the workpiece, further movements of the truing tool relative to the workpiece are due to wear of the truing tool, indexing of the truing tool and thermal changes and are unpredictable. It is these unpredictable movements and changes for which the machine of the invention adjusts itself automatically, in addition to normal compensation for reduction of wheel diameter due to wheel wear and truing.

If it were possible, as it is not, to maintain the truing tool point in an absolutely constant fixed relation through a succession of grinding cycles, then, referring to Fig. 1, it would be expected that the feed dial 175, starting from retracted position with its cam 176 against the stop pin 177, would always turn the same amount to grind a succession of workpieces to the same size, since the grinding wheel 4 is advanced independently of the rotation of the feed screw 100 to compensate for its reduction in size by truing. But because in practice the cutting point of the diamond drifts or changes toward or away from the wheel from cycle to cycle, the feed dial 175 does not end up in the same position from cycle to cycle when the wheel reaches a finish position.

For the most accurate dimensioning of work over a succession of cycles, therefore the dial 175 cannot be used to stop the feeding when the work reaches finished size, nor can it be used to reduce the feed for the finishing operation consistently at a predetermined distance from the final position of the surface of the wheel relative to the work.

When because of wear, indexing or thermal changes the position of the truing tool changes relative to the work, the grinding wheel is during one cycle reduced by truing by the normal amount controlled by rotation of the nut 101, plus or minus an error caused by the drift of the truing tool. Such an error would ordinarily change the points during feed relative to the finished work surface at which truing and reduction to finish grinding rate occurs, and would therefore disturb a desirable pre-established period or extent of finish grinding. Such an unpredictable change, particularly in the point at which reduction of feed occurs with relation to the end of the grinding operation, is one of the principal difficulties overcome by the machine of the invention.

The feed control mechanism maintains a predetermined relationship between the reduction of feed for finished grinding and the termination of grinding. This is accomplished by automatic readjustment of the slip ring 185 in either direction relative to the feed screw dial 175 at the end of each cycle when the error occurs so that at the next following cycle the desired predetermined relationship between reduction of the feed for finish grinding and the cutting surface of the wheel is preserved.

A brief description of the cycle with reference to the feed control mechanism will help clarify the principle.

Referring to the mechanism of Fig. 1, while the feed dial 175 is in fully retracted fixed position, with the cam 176 against the stop pin 177, the work is advanced a predetermined amount toward the wheel by rotation of the nut 101 to compensate for truing. Then the feed screw 100 turns clockwise and feeds the work toward the wheel at a rapid rate to approach the work and for rough grinding until the cam 191 on the slip ring 185 closes the switch T. The wheel has now advanced a distance which is the sum of the rotation of the feed screw 100 plus the rotation of the nut 101. Closure of the switch T causes a partial retraction of the feed dial until the cam 176 closes the switch Q. With the feed dial 175 in its fixed partially retracted position, the wheel is passed across the truing tool, making the radius of the wheel smaller than in the previous truing by the amount of advance caused by rotation of the nut 101. After truing, the feed dial 175 is advanced clockwise, still at the rapid feed rate, until the cam 194 on the slip ring closes the switch S, which reduces the feed from rapid to finish rate. The feed dial 175 continues clockwise until the gage 10 enters the work at final size, and then stops moving. At this point the solenoid 189 forces the roll 187 into the notch 186, indexing the slip ring in relation to the final position of the cutting surface of the wheel when it is against the finished work surface. The feed dial is then retracted until the cam 176 abuts against the stop pin 177.

On the next cycle, the cam 191 operating the switch T retracts the work for truing at a predetermined distance from the final feed position because the cam 191 was indexed with relation to the wheel cutting surface which is rough grinding. The feed screw backs off to truing position and the wheel is trued. If the diamond has not drifted, the cam 194 operating the switch S slows the feed to finish rate the same distance from the final position of the wheel and work as in the previous cycle because the wheel surface has been advanced relative to the dial 175 by the amount it was trued. At this point the notch 186 in the slip ring will be opposite the roll 187 and although the roll 187 enters the notch 186, the slip ring does not move relative to the feed dial 175.

However, if prior to the second cycle, the diamond has drifted toward the work, i.e., away from the wheel, it would have reduced the wheel radius by an amount less than normal and would have left the wheel larger than expected. In this case, while the cam 191 and switch T have caused retraction for truing at the same distance from final position as previously, the cam 194 operates the switch S after truing to slow the feed at a point when the cutting surface of the wheel is closer to the finished work surface, thereby during one cycle shortening the extent or period of final slow feed. Since the wheel is larger than expected, the feed screw 100 does not turn as far to feed to final position of work and wheel. Therefore, when the gauge 10 enters the work to terminate grinding and the slip ring 185 stops moving, it has not advanced as far as previously. Therefore, when the roll 187 enters the notch 186, the slip ring is advanced clockwise relative to the feed dial. On the subsequent cycle, therefore, the feed reduction point at which the cam 194 operates the switch S is re-established to the desired predetermined relationship to the cutting surface of the wheel and to its final position against the finished work surface.

Similarly, if the truing tool drifts toward the wheel, it will true the wheel smaller than expected. When the work and wheel have reached final position, the slip ring 185 will be in an advanced position, in which case it is retarded by insertion of the indexing roll 187 in the notch 186 to restablish the operating position of the slip ring cams 191 and 194 relative to operation of the gage and the cutting surface of the wheel.

Since the extent or period of slow feed is re-established after one cycle, it is apparent that it is the distance of fast feed from the retracted position of the wheel which is varied to compensate for movement of the position of the truing tool due to drift.

When the feed control mechanism of Fig. 16 is substituted for the feed control mechanism of Fig. 1, truing occurs when the cam 191a fixed to the feed dial 175 closes the switch T which it does when the dial 175 is at a fixed distance from its point of beginning which is fixed by the cam 176 and the stop pin 177 and at a variable distance from its position at the end of grinding. Retraction for truing is eliminated and the wheel is withdrawn from the work and trued at the point it has reached when the switch T is closed. Fast feed then continues until the switch S is closed by the cam 194 on the slip ring 185 and the latter is readjusted relative to the dial by an identical indexing arm 188 and roll 187 so that the reduction of feed for finish grinding has a predetermined relation to the cutting surface of the wheel and therefore to the termination of feed by operation of the gage 10 as with the mechanism of Fig. 1.

The difference between the feed control mechanisms of Fig. 1 and Fig. 16 is that in the mechanism of Fig. 1 the wheel is retracted from the work before truing to relieve spindle spring at the expense of time for retraction and feeding in from the retraction point, whereas in Fig. 16, since the wheel is not retracted for truing, time is saved at the expense of truing without relieving spindle spring. Also, in the mechanism of Fig. 1, the truing position with relation to feed is held at a fixed distance from the finished position of the wheel surface whereas in Fig. 16 the truing point is held at a variable distance with respect to the finished position of the wheel surface.

When a variety of work is to be ground, we prefer to build the machine so that it may be set up to operate either as in Fig. 1 or as in Fig. 16, depending on the proportions of the wheel spindle and the accuracy required.

In the case of either feed control mechanism truing may be initiated by a roughing gage 12 instead of by switch T. The roughing gage acts when the work reaches a predetermined rough size, that is, the truing point is at a fixed distance from the final position of the wheel.

Figure 21:
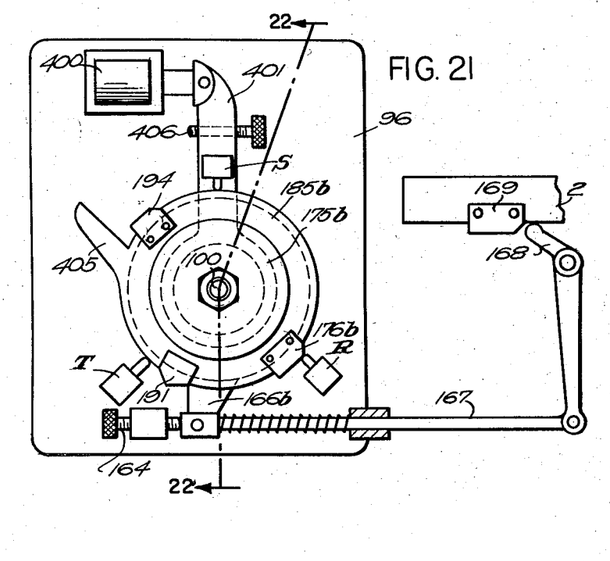
Fig. 21 is front elevation of another modification of the feed control mechanism.
Figure 22:
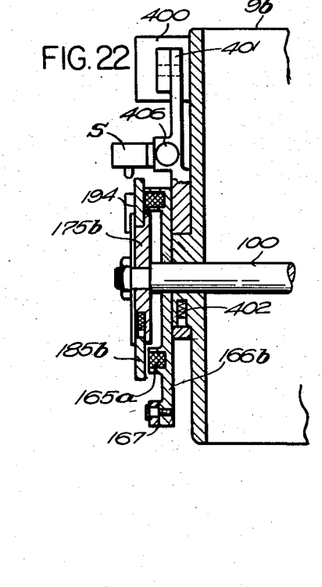
Fig. 22 is a view taken along the line 22—22 of Fig. 21.

In a third embodiment of the feed control mechanism, Figs. 21 and 22, the nut 101 does not rotate and a slip ring is turned instead to compensate for wheel wear and truing.

As shown, the screw 100 has been retracted counter-clockwise, carrying a dial 175b, slip ring 185b, and cam 176b thereon until switch R is operated to stop retraction. Any variation in the stopping position does not change the relation of the slip ring 185b to the feed screw.

As the table 2 moves to its right or loading position the electro-magnetic friction clutch 165d is energized and rocked counterclockwise by the cam 169, rock arm 168 and link 167 as described in connection with Figs. 9 and 13 engaging the slip ring 185b and turning it counterclockwise relative to the dial 175b an exact amount adjusted by a screw 164, for compensation. The clutch 165d is de-energized when the table 2 starts in to the left.

After a new workpiece has been loaded, the screw 100 is turned clockwise in feed direction, the wheel is trued, and fast feed is resumed, as has been described in connection with Fig. 16, until the cam 194 operates the switch S', which in addition to slowing the feed rate energizes a solenoid 400, rocking counterclockwise a lever 401 which is frictionally mounted on the feed box 9b and which carries the switch S'. A spring 402 provides sufficient friction so that cam 194 can operate the switch S' without moving the lever 401.

Further motion of the screw 100 and slip ring 185b in feed direction causes a lug 405 on the slip ring 185b to move an adjusting screw 406 and the lever 401 until feed is stopped by the work gage.

Thus at each cycle and by adjustment in either direction, the switch S' is brought to a predetermined relation with the final position of the cam 194 and the cutting surface of the wheel after truing. The finish feed distance moved by the work support, from its position when the switch S' is operated to final position, will therefore be a preset distance in the following cycle, except for any change that occurs in one cycle. That is, errors do no accumulate.

It will be noted that the finish feed distance may be less than the compensation for wheel wear and truing, which would not be accomplished by simply arranging the slip ring to strike a stop for compensation.

With the arrangement described, slow-down may occur earlier, later or at the same point, relative to final position of the feed screw as in the previous cycle.

While the arrangement shown in this modification provides for truing without retraction, that is, at the point in feed where the cam 191 operates the switch T, it will be understood that this modification, as in the arrangement shown in Fig. 1, may also be arranged to provide truing at a retracted position as by provision of the switch Q and associated mechanism. This modification eliminates the slip ring positioning arm 188, its operating solenoid 189 and associated switch P and also the table operated switch C.

In all of these embodiments of the control means for maintaining constant the interval of reduced feed of the cutting surface of the grinding tool, the adjustment is made in either direction according to the unpredictable variations in wheel diameter, i.e., either larger or smaller in accordance with drift of the truing tool toward or away from the grinding tool.

*Electric control mechanism*

Figure 7:
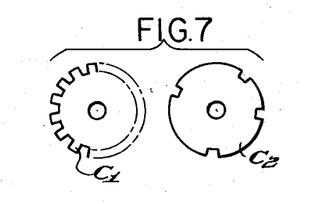
Fig. 7 is a view of typical control cams.

The timed sequence of operation may be accomplished by an electric control system of any suitable type. One such system illustrated schematically in Fig. 17 includes an electric circuit originating at power lines $L_1$ and $L_2$, including switches A, B, C operated by a cam 15 under the table 2 in Fig. 1, switches B and C being operated by cam 15 and switch A by the nut 36 in Fig. 3, switches Q and R operated by the cam 176 on the feed dial, switches T and S operated by the cams 191 and 194 on the slip ring, switch P operated by the slip ring indexing arm 188 and a safety switch 68 operated by the table-reciprocating clutch 47. A power driven selector switch or "traffic control" mechanism generally indicated at 200 in Fig. 17 comprises a series of switches operated by cams of a type indicated at $C_1$ and $C_2$ in Fig. 7 on a cam shaft 201, which is arranged to be progressively rotated step by step in angular increments from one indexed position to another by connecting it through a clutch 203 to a constantly rotating motor 202. The clutch 203 is electrically actuated and is arranged to move the cam shaft 201 one step at a time and then to disengage itself. This selector mechanism is automatically moved from one station to the next and serves to energize parts of the circuit and to de-energize other parts of the circuit which have been operative during a previous part of the operative cycle.

The details can best be understood by a description of a full cycle of operation of the machine and modifications of Figs. 1–17.

With the table 2 at extreme right-hand or "out" position prior to the commencement of the cycle, a new workpiece 7 is loaded in the work head 6.

A starting switch 208 is closed manually or otherwise, as by the loading of the workpiece to start the new cycle, and a circuit is formed between power lines $L_1$ and $L_2$ through a switch 213, which has been closed by a cam 212 during a previous movement of the cam shaft 201, to energize and engage the cam shaft clutch 203 moving the cam shaft to its first position.

In first position, cams 215 and 220 close switches 216 and 221 forming a circuit between power lines $L_1$ and $L_2$ including lines 217 and 218 to energize and engage the table-in and rapid traverse clutches 25 and 27, respectively. The switch 68 in the line 218 is being held closed by the arm 69, with the table-reciprocating clutch 47 in disengaged condition. The table moves rapidly in to the left to insert the wheel 4 in the workpiece 7. A A cam 224 also closes a switch 225 in a line to open switch B and through the cam shaft clutch 203.

When the table has moved most of the way in to the left, it is slowed to slow traverse speed to reduce shock. For this purpose the cam 15 under the table closes the switch B, energizing the cam shaft clutch 203 to move the cam shaft 201 to its second indexed position.

In second position the cam 215 opens the switch 216, de-energizing the rapid traverse clutch 27 and a cam 222 closes a switch 223 to energize the slow traverse clutch 28. A cam 228 closes a switch 229 in a line to switch A which is open at this time.

When the table 2 comes in to its extreme left-hand position, it closes the switch A, energizing the cam shaft clutch 203 to move the cam shaft to its third indexed position.

In third position the cams 220 and 222 open their respective switches 221 and 223 disengaging the table-in and slow traverse cluthces 25 and 28, respectively, and bringing the table momentarily to a stop.

In the mechanism of Fig. 2, the latch 53 must be allowed to drop into engagement with the pin 55 when the table is at rest at a known position. For this purpose a cam 226 opens a switch 227 to de-energize the latch solenoid 57 and engage the latch 53 to the table, the latch crank 59 having been stopped on dead center by its driving clutch 47. In the mechanism of Fig. 3 the latch operating means are of course not required.

In third position of the cam shaft, a cam 230 also closes a switch 231, which energizes the reciprocating clutch solenoid 66. The reciprocating clutch 47 is thereby engaged to turn the crank 59 to reciprocate the wheel in the work, and the switch 68 is opened to prevent operation of the table-operating clutches 25–28 while the table 2 is reciprocating.

A cam 242 closes a switch 243 bringing the $L_2$ line through the switch J to the open switch T and a cam 238 also closes a switch 239 energizing the fast feed clutch 140, and the work is fed rapidly toward the wheel until the switch T is closed by the cam 191 on the slip ring 185.

Figure 17:
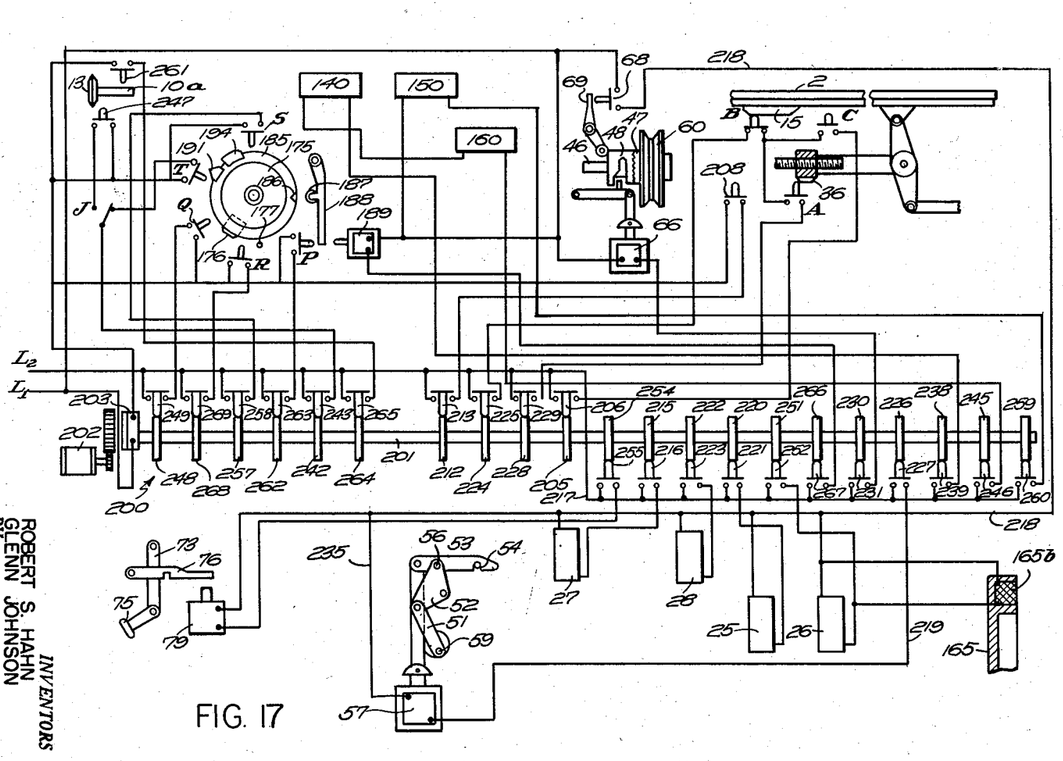
Fig. 17 is a layout showing the electric control mechanism and associated parts.

When the switch J is in the position shown in Fig. 17 closure of the switch T energizes the clutch 203 to move the cam shaft 201 to the fourth position. Alternatively, when the switch J is set to the left, the gage element 13 on the gage shaft 10a closes a switch 247 to move the cam shaft to fourth position when the small element 12 of the gage 10 enters the work 7.

In fourth position of the cam shaft 201 the cam 238 opens the switch 239 disengaging the fast feed clutch 140 and a cam 245 closes a switch 246 engaging the retraction clutch 160, retracting the wheel 4 away from the work. A cam 248 closes a switch 249 in a circuit through a switch Q. Counterclockwise retraction movement of the dial causes the cam 176 to close the switch Q which energizes the clutch 203, moving the cam shaft 201 to fifth position.

In fifth position the switch 246 is opened by the cam 245 breaking the circuit through the retraction clutch 160 and stopping the retraction movement at a known position.

The cam 230 opens the switch 231 de-energizing the reciprocating clutch solenoid 66 and disengaging the reciprocating clutch 47 and at the same time closing the safety switch 68. In the mechanism of Fig. 2 the cam 226 closes the switch 227 to energize the latch solenoid 57, raising the latch from its pin 55.

A cam 251 closes a switch 252 to engage the table-out clutch 26 and the cam 222 closes the switch 223 engaging the slow traverse clutch 28, moving the table out to the right at slow traverse speed for truing.

A cam 254 closes a switch 255, energizing the truing solenoid 79 unlatching the truing tool 70, allowing it to ride down into position on the table cam 74 as the table moves out to the right. The wheel passes across the truing tool with the feed screw in a known position.

The cam 224 closes the switch 225 in the line through the switch B, and when the table cam 15 closes the switch B when the table is part way out to the right, the cam clutch 203 is energized, moving the cam shaft to sixth position.

In sixth position of the cam shaft 201 the cam 251 opens the switch 252 de-energizing the table-out clutch 26 and the cam 220 closes the switch 221 to energize the table-in clutch 25, bringing the table back in to insert the wheel in the work after truing. The cam 254 opens the switch 255 de-energizing the truing solenoid 79. The table cam 74 raises the truing tool into inoperative position where it is latched in place. The cam 228 closes the switch 229 and, as the wheel enters the work, the table closes the switch A energizing the cam shaft clutch 203, moving the cam shaft to seventh position.

In seventh position the cams 220 and 222 open the switches 221 and 223 disengaging the table clutches 25 and 28 and the table comes momentarily to rest. The cam 226 opens the switch 227 disengaging the latch solenoid 57, allowing the latch 53 to fall into and engage the table pin 55. The cam 230 closes the switch 231 to energize the reciprocating clutch solenoid 66, causing the table to reciprocate. The switch 68 closes and the cam 238 closes the switch 239 engaging the fast feed clutch 140, feeding the work toward the wheel and a cam 257 closes a switch 258 in the line to the open switch S. When the cam 194 on the slip ring 185 closes the switch S, the cam shaft clutch 203 is energized to move the cam shaft 201 to eighth position.

In eighth position the cam 238 opens the switch 239, disengaging the fast feed clutch 140 and a cam 259 closes a switch 260 engaging the slow-feed clutch 150. A cam 264 closes a switch 265 in the line through a normally open gage-operated switch 261.

The work feeds slowly into final work size, at which point the large portion 11 of the gage 10 enters the work and the gage element 13 closes the switch 261, which energizes the cam shaft clutch 203 to move the cam shaft to ninth position.

In ninth position the slow feed clutch 150 is disengaged by the cam 259 which opens the switch 260 to stop feed. A cam 262 closes a switch 263 in the line through a normally open switch P. A cam 266 closes a switch 267 energizing the slip ring indexing solenoid 189, which moves the roll 187 on the indexing lever 188 to index the slip ring 185. Movement of the indexing lever 188 closes the switch P which energizes the cam shaft clutch 203, moving the cam shaft to tenth position.

In tenth position the cam 245 closes the switch 246 and engages the retraction clutch 160 to retract the feed screw. The latch solenoid 57 is energized by the cam 226 which closes the switch 227 to disengage the latch 53, and the cam 230 opens switch 231 and de-energizes the reciprocating clutch solenoid 66, which disengages the clutch 47 and closes the switch 68. A cam 205 closes a switch 206 in the line through the switch C. The cam 215 closes the switch 216 and engages the rapid traverse clutch 27 and the cam 251 closes the switch 252 and engages the table-out clutch 26, thus moving the table out into its right-hand loading position. When the table closes switch C the cam shaft clutch 203 is engaged to move the cam shaft to its eleventh position.

In eleventh position cam 251 opens switch 252, disengaging the table-out clutch 26 and bringing the table to rest. A cam 268 closes a switch 269 in a line to the open switch R.

When at the end of final retraction of the feed mechanism the cam 176 on the dial 175 strikes the stop pin 177, it also closes the switch R, moving the cam shaft to twelfth position.

In twelfth position the cam 245 opens the switch 246, disengaging the retraction clutch 160 and bringing the feed mechanism to a stop in retracted position.

*Alternative operation*

For operation of the modification of the machine as shown in Figs. 18–22, the electrical control mechanism of Fig. 17 may be modified and adapted as shown in Fig. 20.

With the table at extreme right position, the cam shaft 201 is indexed to its first position, as by closing the switch 208 as has been described.

In first position c the cam 220' closes the switch 221' to energize the table-in clutch 25b, turning the crank 304 to its position x where it is stopped by the opening of switch X in series with clutch 25b. The cam 266' opens the switch 267' deenergizing the clutch 165d. Solenoid valve 326 is open. The crank 45b is in the position shown in Fig. 18 and with the wheel in central position in the work after the table 2 moves to the left the table cam 15 operates the switch A, indexing the camshaft 201 to its second position.

In the second position the cam 242 closes the switch 243 bringing the $L_2$ line through the switch J in the position shown in Fig. 17 to the open switch T and the cam 238 also closes the switch 239 energizing the fast feed clutch 140, and the work is fed rapidly toward the wheel until the switch T is closed by the cam 191 on the slip ring 185b. Closure of the switch T energizes the clutch 203 to move the cam shaft 201 to the third position. Alternatively, when the switch J is set to the left, the gage element 13 on the gage shaft 10a closes the switch 247 to energize the cam clutch 203 and move the cam shaft to third position.

In the third position the cam 238 opens the switch 239 disengaging the fast feed clutch 140 to stop the feed, the cam 251' closes the switch 252' to engage the table-out clutch 26b moving the crank 304 to its position y where it is stopped by the opening of switch Y in series with the clutch 26b.

The cam 222' closes the switch 223' energizing the solenoid 326a and closing the by-pass valve 326.

The cam 254 closes the switch 255, energizing the truing solenoid 79 unlatching the truing tool 70, allowing it to ride down into position on the table cam 74 as the table moves out to the right. The wheel passes across the truing tool with the feed screw in a known position.

The cam 224 closes the switch 225 in the line through the switch B, and when the table cam 15 closes the switch B when the table is part way out to the right, the cam clutch 203 is energized, moving the cam shaft to fourth position.

In fourth position the cam 251' opens the switch 252' in the circuit through the table-out clutch 26b and the cam 220' closes the switch 221' to energize the table-in clutch 25b, moving the crank 304 to its position x where it is stopped by opening of the switch X. The cam 254 opens the switch 255 de-energizing the truing solenoid 79. The table cam 74 raises the truing tool into inoperative position where it is latched in place. The cam 228 closes the switch 229 and, as the wheel enters the work, the table closes the switch A energizing the cam shaft clutch 203, moving the cam shaft to fifth position.

In fifth position the cam 222' opens the switch 223' de-energizing the solenoid 326a and opening the solenoid valve 326. The cam 230 closes the switch 231 to energize the reciprocating clutch solenoid 66, causing the table to reciprocate. The switch 68 opens and the cam 238 closes the switch 239 engaging the fast feed clutch 140, feeding the wheel toward the work for a final grinding operation, and the cam 257' closes the switch 258' in the line to the open switch S'. When the cam 194 on the slip ring 185b closes the switch S' the solenoid 400 is energized to position the switch S' to the left and the camshaft is moved to its sixth position.

In sixth position the cam 257' opens the switch 258', deenergizing the solenoid 400. The cam 238 opens the switch 239, disengaging the fast feed clutch 140, the cam 259 closes the switch 260 engaging the slow feed clutch 150 and the cam 264 closes the switch 265 in the line through the normally open gage-operated switch 261.

The wheel feeds slowly in to final work size, at which point the large portion 11 of the gage 10 enters the work and the gage element 13 closes the switch 261, which energizes the cam shaft clutch 203 to move the cam shaft to seventh position.

In seventh position the slow feed clutch 150 is disengaged by the cam 259 which opens the switch 260 to stop feed. The cam 266' closes the switch 267' energizing the clutch 165d.

The cam 245 closes the switch 246 and engages the retraction clutch 160 to retract the feed screw. The cam 230 opens switch 231 and de-energizes the reciprocating clutch solenoid 66, which disengages the clutch 47 and closes the switch 68. The cam 215' closes the switch 216' short circuiting the switch Y and the cam 251' closes switch 252' engaging the table-out clutch 26b turning the crank 304 to the position of Fig. 18, where it is stopped by opening of switch C' at final position c. The cam 268 closes the switch 269 in the line through the switch R, and at the end of final retraction of the feed mechanism the cam 176b on the slip ring 185b closes the switch R, moving the cam shaft to eighth position.

In eighth position the cam 245 opens the switch 246, disengaging the retraction clutch 160 and bringing the feed mechanism to a stop in retracted position.

As the table moves to its right-hand or loading position the table cam 169 rocks levers 168 and 166b counterclockwise turning the slip ring 185b for compensation.

We claim:

1. In a grinding machine including a work support, a tool support and a grinding tool mounted on the tool support, one of said supports being movable relative to the other to bring the grinding tool into and out of overlapping relationship with a workpiece on the work support, and in combination, means resiliently connected to the movable support to move said movable support in either direction, a dashpot connected to said movable support, and control means for the dashpot to control the rate of movement of the movable support.

2. In the combination as set forth in claim 1, said control means including valves selectively operable and providing at least two rates of movement of the movable support in at least one direction.

3. In the combination as set forth in claim 1, said dashpot including a piston rod, said resilient means comprising a spring cage mounted on and movable relative to the piston rod and having a compressible spring engageable against compression in either direction with the piston rod, and means to move the spring cage in either direction.

4. In the combination as set forth in claim 3, said means to move the spring cage comprising a crank connected to the spring cage and means to move the crank in either direction.

5. In a grinding machine including a work support, a tool support and a grinding tool mounted on the tool support, one of said supports being movable relative to the other to bring the grinding tool into and out of overlapping relationship with a workpiece on the work support and in combination, means resiliently connected to the movable support to move said movable support in either direction, a dashpot connected to said movable support to control the rate of said movement and additional means to oscillate said support when said resiliently connected means is inoperative.

6. In the combination as set forth in claim 5, a lever connected to said movable support, said resiliently connected means being connected to said movable support through said lever.

7. In the combination as set forth in claim 5, a lever connected to said movable support, said dashpot being connected to said movable support through said lever.

8. In the combination as set forth in claim 5, a lever connected to said movable support, said additional means to oscillate said movable support being connected to said movable support through said lever.

9. In the combination as set forth in claim 5, a lever connected to said movable support, said dashpot having a piston and a piston rod connected to said lever, said resiliently connected means including a spring connected to said piston rod, said additional means to oscillate said movable support being connected to said lever in spaced relation to the connection between said piston rod and said lever, said piston rod and said additional means each acting as a fulcrum for the lever when the other is operating.

10. In a grinding machine including a work support, a tool support and a grinding tool mounted on the tool support, one of said supports being movable relative to the other to bring the grinding tool into and out of overlapping relationship with a workpiece on the work support and in combination, a first means to move said movable support in either direction, a second means to produce an oscillating movement of the movable support, and spring means urging the movable support toward a central position between the reversal points of the said oscillating movement thereby supplementing reversing action by the oscillating means.

11. In the combination as set forth in claim 10, said spring means comprising a torsion bar connected to the oscillating means.

12. In the combination as set forth in claim 10, a weight oscillated by the oscillating means and having a motion opposite to that of the movable support during its oscillation, thereby providing a pulsating couple.

13. In the combination as set forth in claim 10, said second means comprising a crank connected to the lever and operable when the first means is inoperative.

14. In a grinding machine including a work support, a tool support and a grinding tool mounted on the tool support, one of said supports being movable relative to the other to bring the grinding tool into and out of overlapping relationship with a workpiece on the work support and in combination, a first means to move said movable support in either direction, a second means to produce an oscillating movement of the movable support, means to stop said second means midway of the reversal points of the said oscillating movement, thereby centering the tool relative to the workpiece for a plunge cut when the first said means places the support at a predetermined point, and control mechanism operating each of said means in a predetermined order.

15. In the combination as set forth in claim 14, said second means comprising a crank.

16. In the combination as set forth in claim 14, spring means urging the movable support toward a central position between the reversal points of the said oscillating movement, thereby supplementing reversing action by the said second means.

17. In the combination as set forth in claim 14, a weight oscillated by the said second means and having a motion opposite to that of the movable support during its said oscillating movement, thereby providing a pulsating couple.

References Cited in the file of this patent

UNITED STATES PATENTS

| 1,014,706 | Houghton | Jan. 16, 1912 |
| 1,945,453 | Steiner | Jan. 30, 1934 |
| 2,520,267 | Arms et al. | Aug. 29, 1950 |

FOREIGN PATENTS

| 674,816 | Great Britain | July 2, 1952 |